July 22, 1958 W. A. RINGLER 2,844,280
MULTI-CELLED ARTICLE CARRIERS
Filed Sept. 21, 1954 9 Sheets-Sheet 7
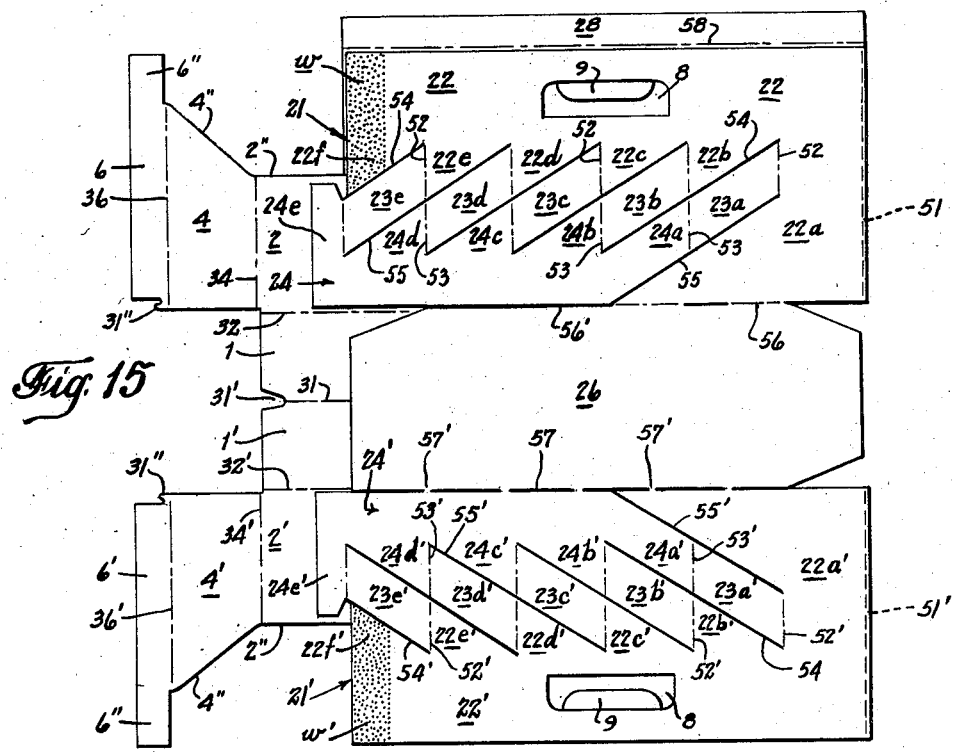
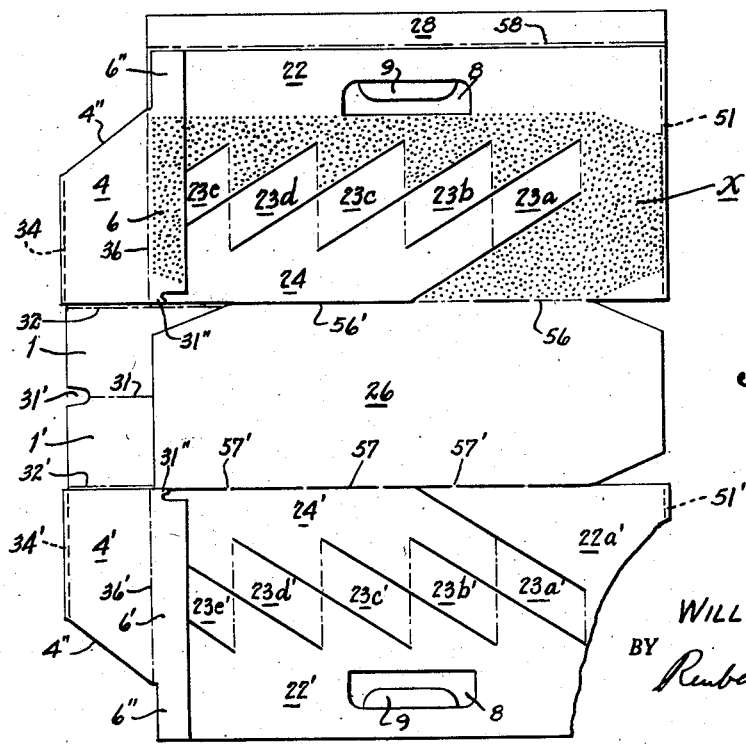
INVENTOR.
WILLIAM A. RINGLER
BY
ATTORNEY July 22, 1958 W. A. RINGLER 2,844,280
MULTI-CELLED ARTICLE CARRIERS
Filed Sept. 21, 1954 9 Sheets-Sheet 8

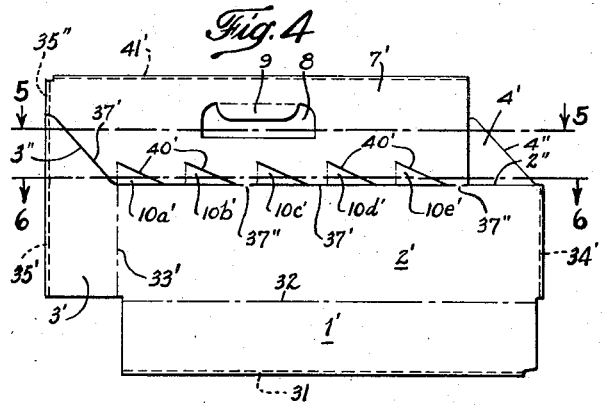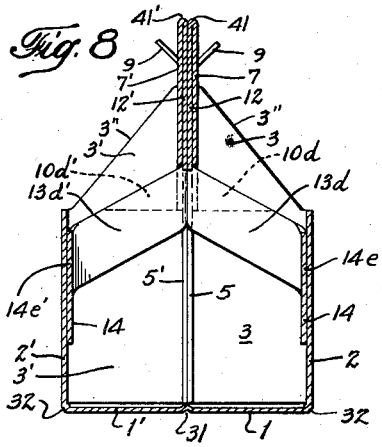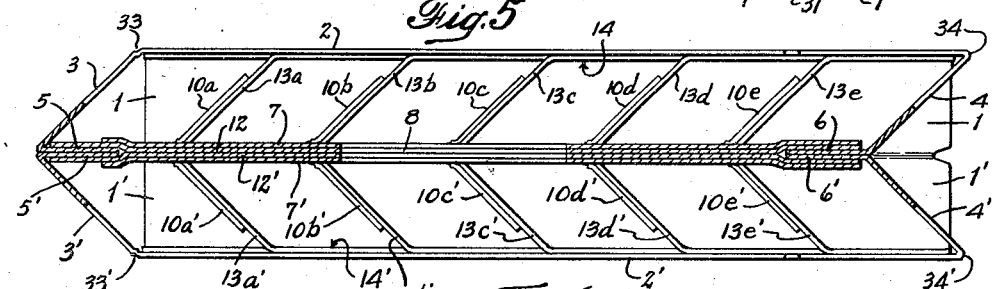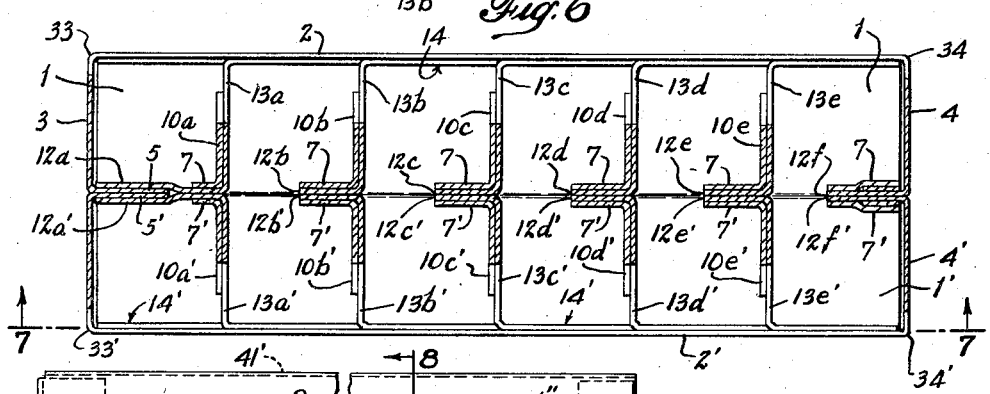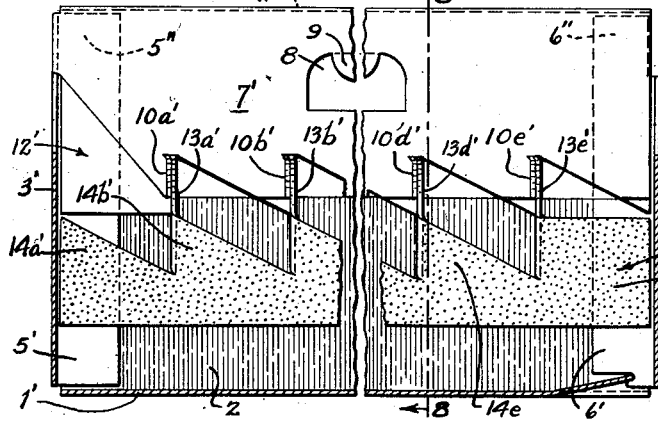

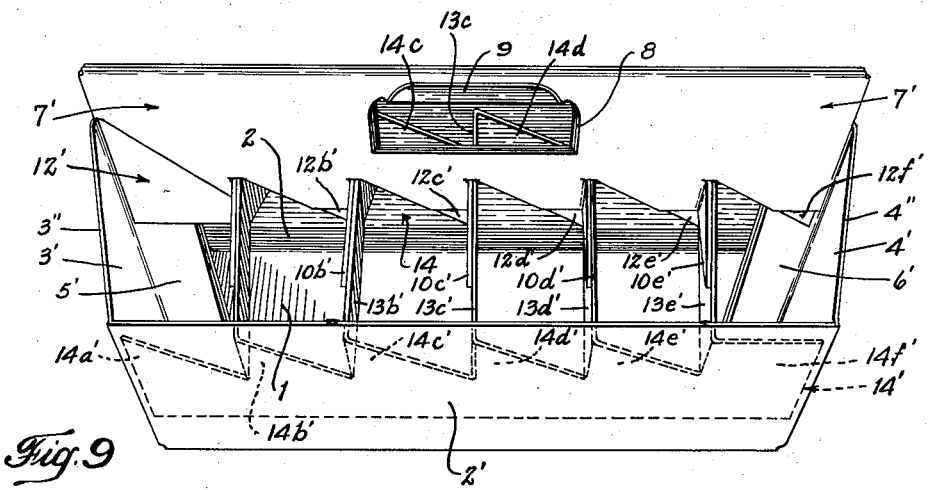
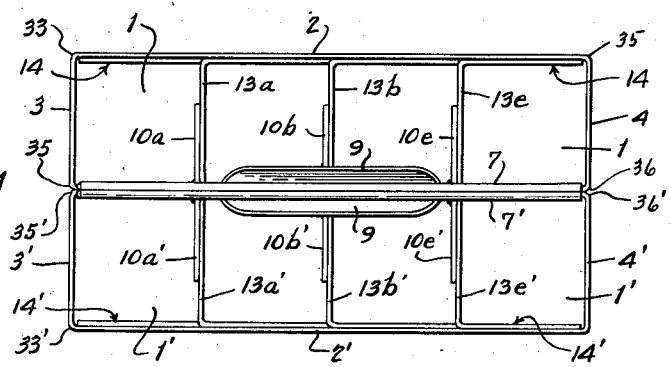
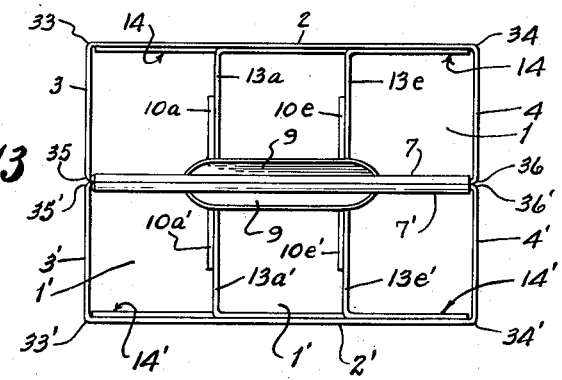

INVENTOR.
WILLIAM A. RINGLER
BY
ATTORNEY

July 22, 1958  W. A. RINGLER  2,844,280
MULTI-CELLED ARTICLE CARRIERS
Filed Sept. 21, 1954  9 Sheets-Sheet 9
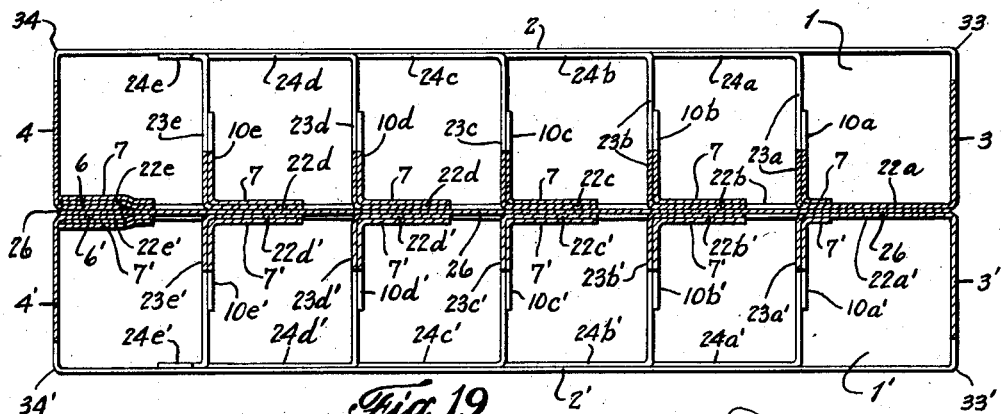
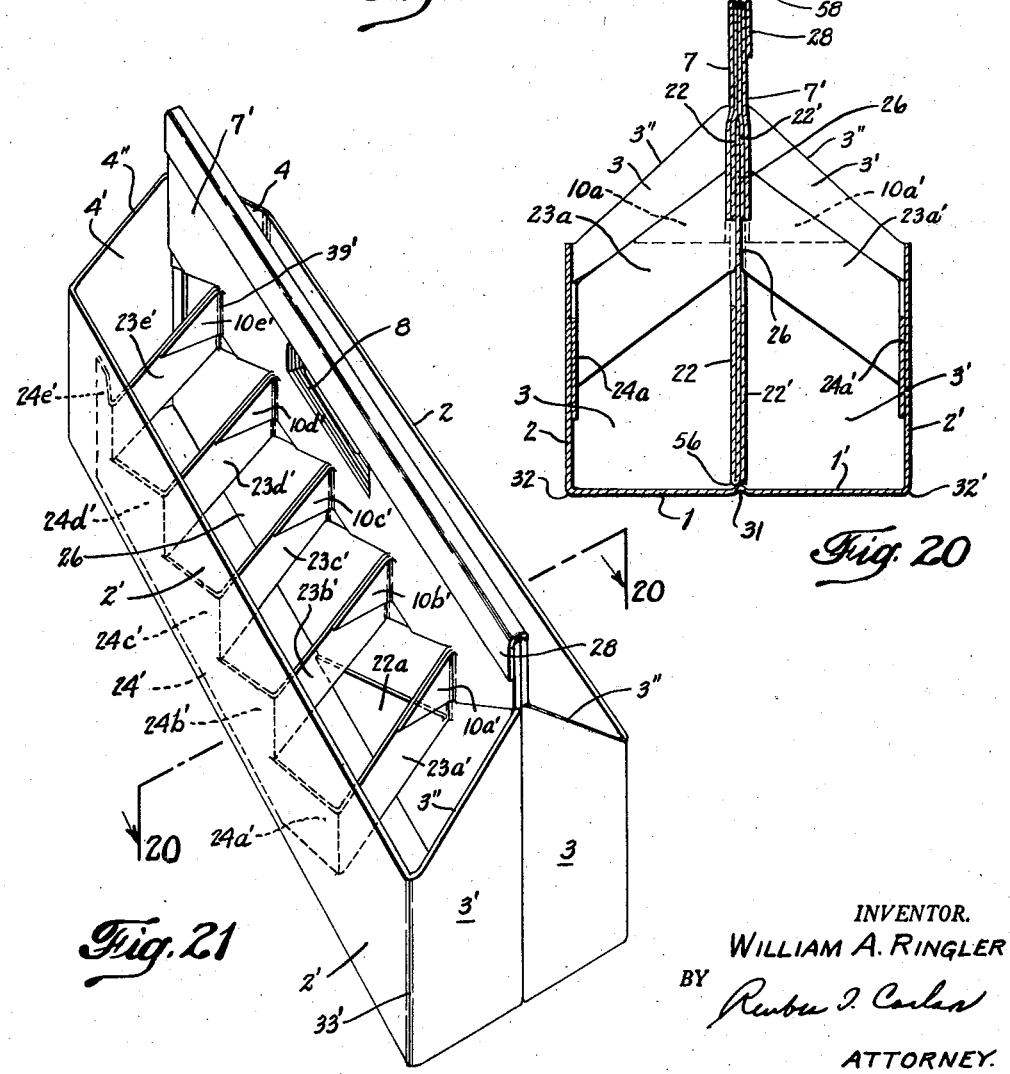
INVENTOR.
WILLIAM A. RINGLER
BY
ATTORNEY.

United States Patent Office 2,844,280
Patented July 22, 1958

2,844,280
MULTI-CELLED ARTICLE CARRIERS

William A. Ringler, Wayne, Pa., assignor, by mesne assignments, to Diamond Gardner Corporation, a corporation of Delaware Application September 21, 1954, Serial No. 457,426

5 Claims. (Cl. 220—113)

This invention relates to multi-celled article carriers formed paperboard or fiberboard and designed to permit flat collapse thereof for economical shipment and storage and convenient erection for article filling and transportation.

Article carriers constructed in accordance with this invention present a pair of skeleton panels from which any desired number of paired cell forming cross partition straps may be captured. The upper portions of the skeleton panel present a pair of inner center partition sections to which the inner ends of the cross partition straps are integrally hinged. These carriers also include a pair of outer center partition sections which are secured to the outside faces of the inner center partition sections to form therewith a center partition structure and a handle part of four-ply thickness extending the full length of the carrier.

The article carriers of this invention are featured by reinforcing segments captured from the outer center partition sections and adhesively secured to the cell defining cross partition straps adjacent the center partition structure to thereby greatly strengthen the cross partition straps in the areas of greatest strain and at points where the cross partition straps are most likely to be broken in use. As a further feature, the side wall panels of these improved carriers are reinforced and stiffened by side wall liner strips captured from the skeleton panels and secured to the inside face of the adjacent side panels and extending substantially the full length thereof and to which the cross partition straps are integrally hinged. The side wall panels can accordingly be made of uniform height throughout, with smooth and even top edges, to thereby enhance the appearance of the carrier and to thereby provide side panels and end panels of any desired height having flat outer faces of substantial area for the reception of advertising decoration.

These article carriers are all formed from one-piece blanks, of appropriate dimensional size, to provide carriers having six, eight, twelve or any desired even number of article receiving cells. In one form of this invention, the one-piece blanks have the skeleton panels thereof integrally hinged along the upper horizontal edges of the outer center partition sections and are downfolded thereover when the carrier is assembled. In this blank form, each outer center partition section is integrally hinged to an end extension of an adjacent end flap which is inturned to provide a portion of the center partition structure when the carrier is assembled. Blanks made in accordance with this form of the invention are fundamentally similar in pattern, irrespective of the number of article receiving cells to be provided, so that the blanks may be cut and scored on the same or similar cutting and scoring machines to provide carriers having any desired number of cells, by merely adding or subtracting and space adjusting the cutting and scoring elements. Likewise, these blanks may be glued and folded to provide assembled carriers in collapsed form, having any desired even number of cells, on the same or similar gluing and folding machines by making only spacing adjustments of the gluing and folding devices thereof.

This invention also encompasses the provision of a modified form of one-piece blanks wherein the paired skeleton panels are integrally hinged at one end thereof directly to the adjacent end panel section and to the adjacent end of the outer center partition section. This blank form is designed to be laterally folded so as to place the skeleton panels thereof in overlying relation to the adjacent outer center partition sections and the adjacent side panels of the blank when in process of assembly into carrier form. This blank modification may also have a center divider panel designed to form a part of the center partition structure which is captured from blank material between the paired skeleton panels and is foldably hinged to the lower end of one of the skeleton panels to thereby provide a center partition structure which extends substantially down to the erected bottom panel and to thus substantially completely separate the twin compartments of the carrier.

In all forms of the invention, strengthening reinforcement for the cross partition straps is provided by a series of spaced segments captured from the lower ends of the outer center partition sections and integrally hinged thereto along vertical scores. By the provision of these segments taken from the outer center partition sections, the inner ends of the cross partition forming strap elements are greatly strengthened in the area where they are most likely to become ruptured from use and thus the useful life of the carrier is substantially increased.

One-piece blanks made in accordance with this invention may be cut and scored from selected stock sheets of paperboard or fiberboard material previously imprinted and decorated on one side thereof only. These carrier blanks are so cut and formed as to permit high speed gluing and folding of the blanks and complete assembly of the article carriers in collapsed form in a single pass through a substantially standard folding and gluing machine.

Other objects and adavntages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. 1 is a plan view of a prepared blank from which a twelve cell article carrier is formed, this view showing adhesive applied to certain areas of the blank preparatory to executing the first folding operation;

Fig. 4 is a plan view as the carrier would appear after the fourth and final folding operation has been performed on the blank shown in Fig. 3, producing the fully assembled carrier in collapsed form ready for shipment;

Fig. 5 is a horizontal cross section of the carrier shown in Fig. 4 as viewed along line 5—5 and as it would appear when undergoing erection expansion;

Fig. 6 is another horizontal cross section of the carrier taken along line 6—6 of Fig. 4 and as it would appear when fully erected;

Fig. 7 is an elevational view of the fully erected carrier with one of the side panels cut away to reveal certain structural details and as it would appear when viewed along line 7—7 of Fig. 6;

Fig. 8 is a transverse cross section taken vertically through the carrier as it would appear when viewed along line 8—8 of Fig. 7;

Fig. 9 is a perspective view of the fully erected twelve-cell carrier assembled from the blank shown in Fig. 1;

Fig. 11 is a top plan view of the eight-cell carrier assembled from the blank shown in Fig. 10;

Fig. 13 is a top plan view of the six-cell carrier formed from the blank shown in Fig. 12;

Figure 14:
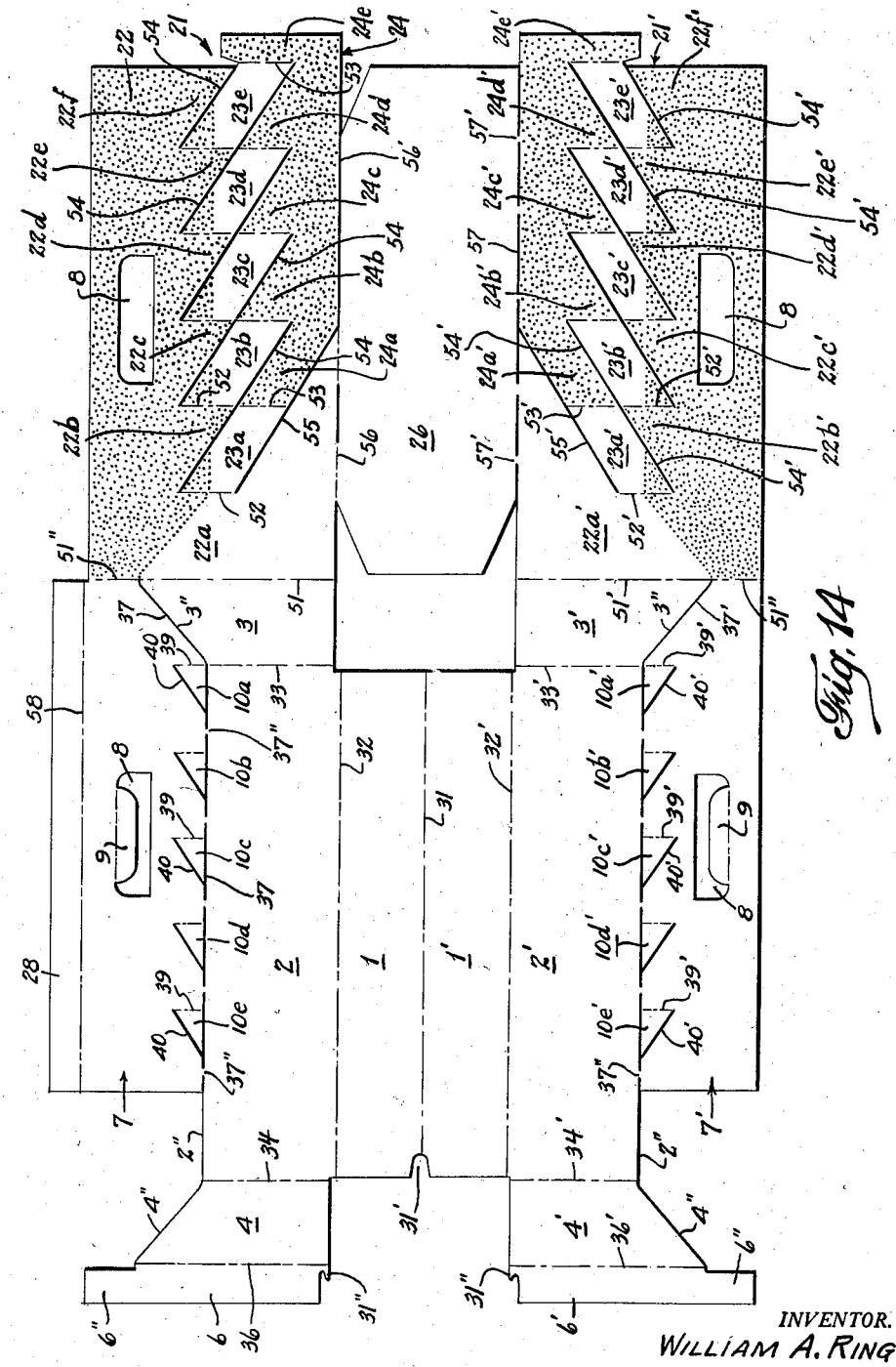
Fig. 14 is a plan view of a modified blank from which a twelve-cell carrier is formed, this view showing adhesive applied to certain areas of the blank preparatory to executing the first folding operation thereon.
Figure 17:
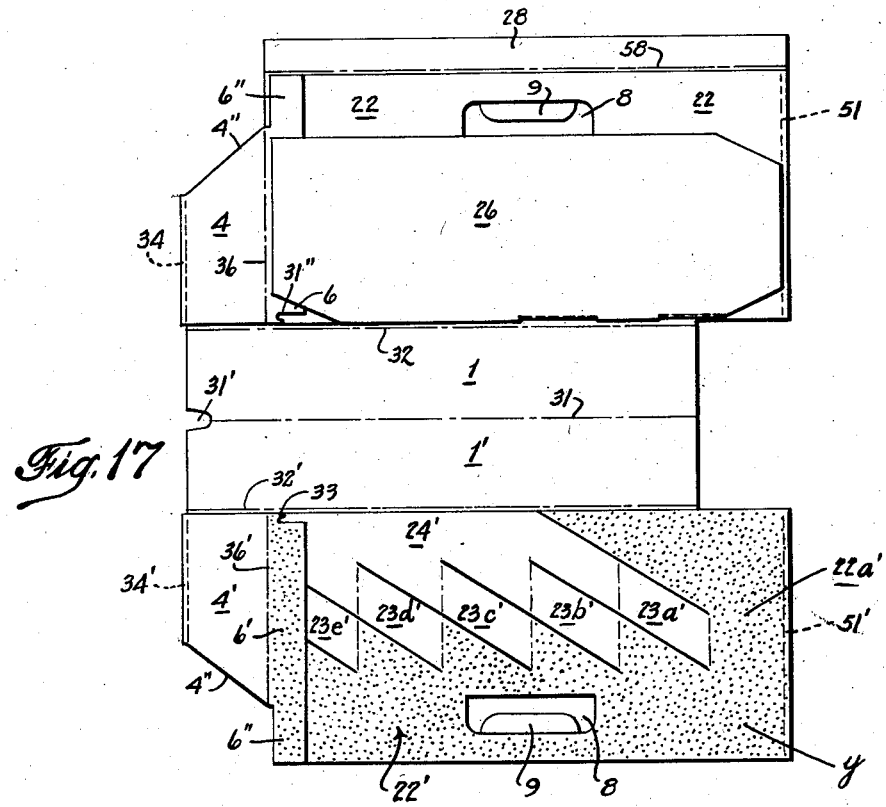
Figure 18:
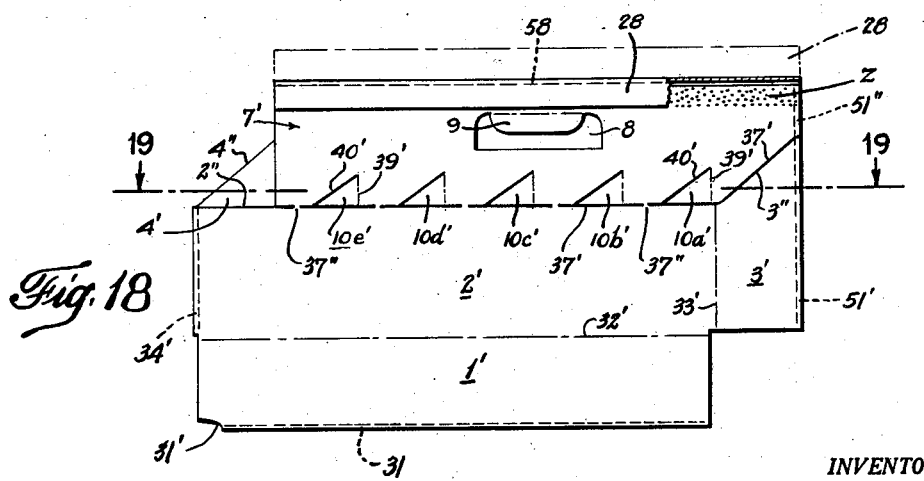

Fig. 15 is a plan view of the blank shown in Fig. 14 as it would appear after the execution of the first folding operation thereon and when the spaced skeleton panels and the center divider panel therebetween have been folded laterally in overlying relation to the outer center partition sections, the side panels and the bottom panel, this view also showing adhesive applied to further areas of the blank preparatory to executing the second folding operation;

Fig. 16 is a plan view of the blank shown in Fig. 15 as it would appear after execution of the second folding operation thereon, adhesive being shown applied to further areas of the blank preparatory to executing the third folding operation;

Fig. 17 is a plan view of the blank shown in Fig. 16 as it would appear after the center divider panel has been folded in overlying relation to the skeleton panel to which it is hinged, this view also showing adhesive applied to further areas of the blank preparatory to executing the fourth folding operation;

Fig. 18 is a plan view of the carrier as it would appear after the fourth and fifth folding operations have been performed on the blank shown in Fig. 17 to thereby produce the completed carrier in collapsed form;

Fig. 19 is a horizontal section of the carrier shown in Fig. 18 as viewed along line 19—19 and as it would appear when fully expanded;

Fig. 20 is a vertical section taken transversely through the erected carrier as it would appear when viewed along line 20—20 of Fig. 21; and Fig. 21 is a perspective view of the fully erected twelve-cell carrier formed from the blank shown in Fig. 14.

Similar reference characters refer to similar parts throughout the several views of the drawings and the specification.

The carrier forming blanks as shown in Figs. 1, 10, 12 and 14 are all cut and scored from selected paperboard or fiberboard stock sheets previously finished and imprinted on one side thereof only. These blanks may be cut from the stock sheets in a single pass through the cutting and scoring machine to provide fully cut and scored blanks ready for gluing and assembly into carrier form. These blanks may be appropriately sized, cut and scored to form carriers of any desired even number of cells as merchandising requirements may indicate, such as carriers having twelve or more cells, or carriers having any even number of cells such as eight cells or six cells.

The blanks shown in Figs. 1, 10, 12 and 14 all present bottom panel sections 1—1' of appropriate length to support the desired number of articles, the bottom panel sections 1—1' being foldably connected along the bottom collapsing score 31 which is approximately medially of the blank. Side panels 2—2' are foldably connected to the opposite side edges of the bottom panel sections 1—1' along parallel extending scores 32—32', the side panels 2—2' having approximately the same length as the bottom panel sections 1—1' to accommodate the desired number of articles placed in the cells thereof. A pair of end panel sections 3—3' are foldably connected to the adjacent end edges of the side panels 2—2' along the aligned transverse scores 33—33' and present inclined top edges 3''. A pair of similar end panel sections 4—4' are foldably connected to the opposite end edges of the side panels 2—2' and are provided with center partition securing flaps 6—6' foldably connected thereto along the aligned transverse scores 36—36'. The center partition securing flaps 6—6' present extensions 6'' extending beyond the inclined top edges 4'' of the adjacent end panel sections 4—4'.

Outer center partition sections 7—7' which have a length approximately equal to the adjacent side panels 2—2' are each provided with a handle hole cutout 8 in the mid-area thereof with which a handle edging flap 9 may be associated. The outer center partition sections 7—7' are substantially separated from the top edge 2'' of the adjacent side panels 2—2' and from the inclined top edges 3'' of the adjacent end panel sections 3—3' by line cuts 37—37'. The line cuts 37—37' are each interrupted by a weakened connecting neck 37'' which temporarily secures the outer center partition sections 7—7' to the adjacent top edges 2'' of the side panels 2—2' as shown in Figs. 1, 10, 12 and 14. The connecting necks 37'' serve to temporarily retain the outer center partition sections 7—7' in flat position and connected to the side panels 2—2' to facilitate folding assembly of the blank into carrier form, after which the connecting necks 37'' are broken.

Figure 1:
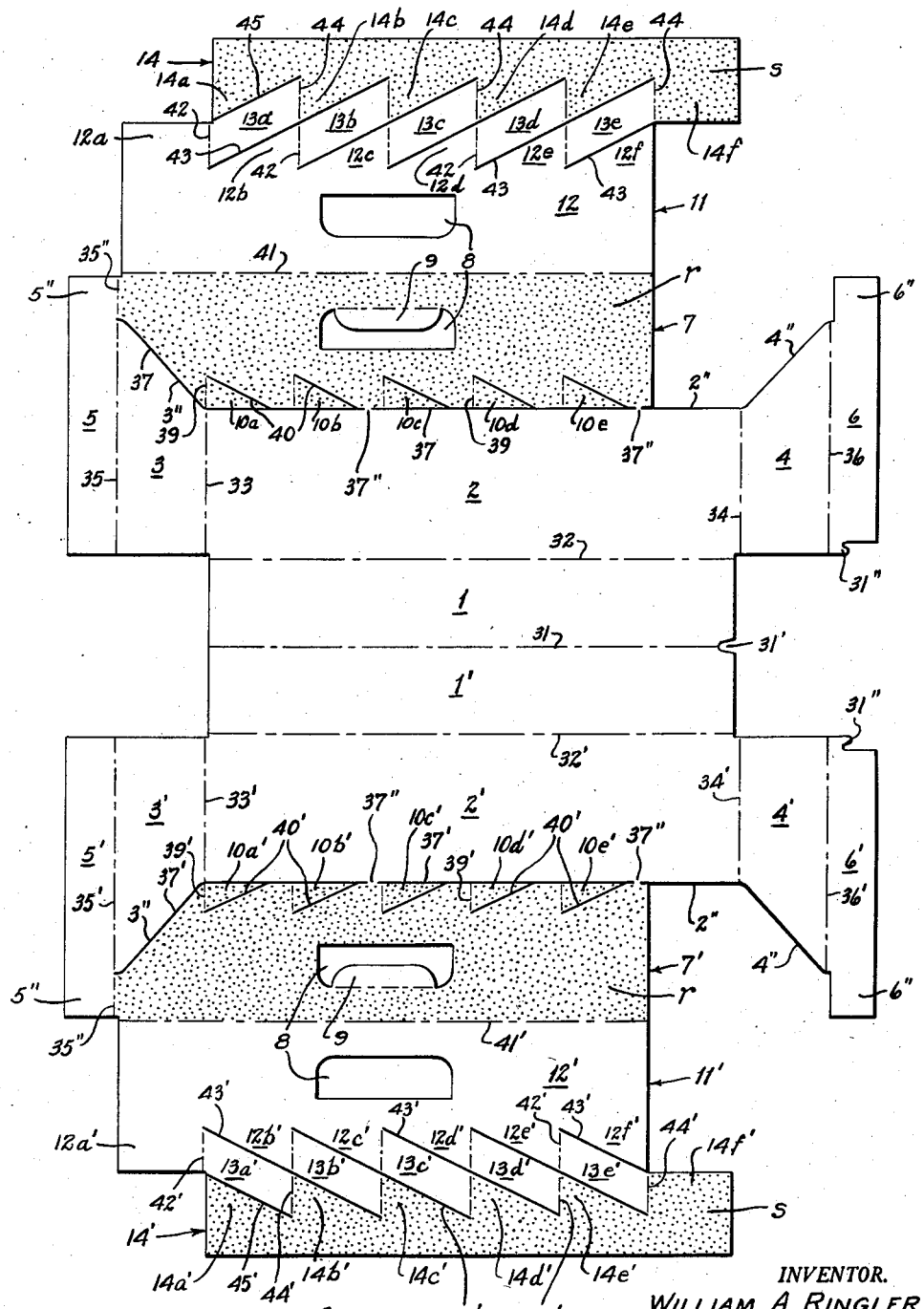
Figure 10:
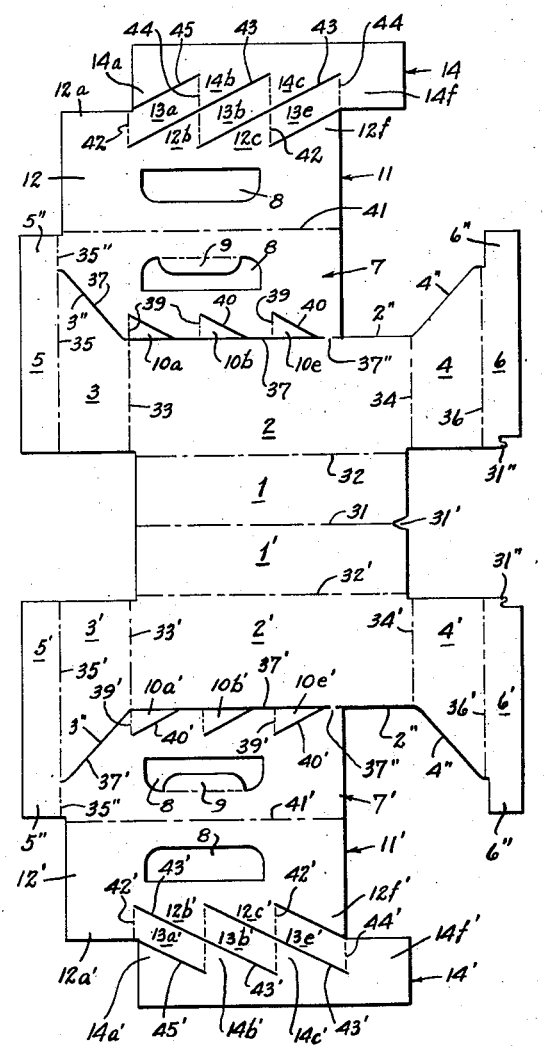
Fig. 10 is a plan view of a prepared blank substantially similar to the blank shown in Fig. 1 but reduced in size and having certain of the intermediate cross partitions eliminated to form an eight-cell carrier.
Figure 12:
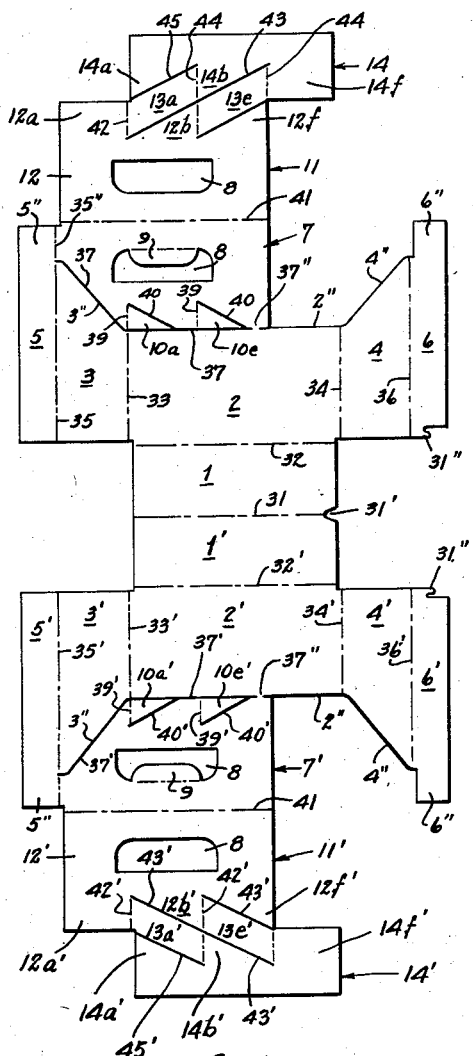
Fig. 12 is a plan view of a prepared blank having the general structural attributes of the blanks shown in Figs. 1 and 10 but otherwise reduced in size to form a six-cell carrier.

All blanks made in accordance with this invention are featured by the provision of triangular shaped reinforcing segments 10—10' which are captured from the lower edge portions of the outer center partition sections 7—7' as shown in Figs. 1, 10, 12 and 14. The triangular segments 10—10' are designed to be adhesively secured in overlapping relation to the inner upper ends of the corresponding cross partition straps which are captured from the skeleton panels, and accordingly, the number of triangular segments correspond to the number of cross partition straps with which the carrier is to be equipped. The triangular segments 10—10' are integrally hinged to the outer center partition sections 7—7' along spaced and vertically extending aligned scores 39—39', but are otherwise separated therefrom by inclined or sloped cuts 40 which define the top edge contour of the triangular segments in conformity with the contour of the corresponding cross partition straps. When a twelve-cell carrier is to be provided, a series of five triangular segments would be captured from the outer center partition sections 7—7' as shown in Figs. 1 and 14 which for convenience are designated 10a—10a'; 10b—10b'; 10c—10c'; 10d—10d'; and 10e—10e'. Where an eight-cell carrier is to be provided, the blank would be sized to provide three pairs of triangular segments 10a—10a'; 10b—10b'; and 10e—10e' as shown in Fig. 10. Where a six-cell carrier is to be provided, the handle facing flaps 7—7' would be equipped with only two pairs of triangular segments 10a—10a' and 10e—10e' as shown in Fig. 12.

In the blank forms shown in Figs. 1, 10 and 12, a pair of center partition securing flaps 5—5' are integrally hinged along aligned transverse scores 35—35' to the adjacent end panel sections 3—3'. The securing flaps 5—5' present end extensions 5'' to which the adjacent ends of the handle facing flaps 7—7' are integrally hinged along transverse scores 35'' which are in alignment with the transverse scores 35—35'.

Each of the center partition structures for the carriers shown in Figs. 9, 11 and 13 is formed by a pair of skeleton panels 11—11' integrally hinged to the upper edges of the adjacent handle facing flaps 7—7' by longitudinally extending scores 41—41' which extend substantially parallel to the adjacent top edges 2" of the side panels 2—2'. The skeleton panels 11—11' have a length substantially equal to the length of the carrier, and the upper center partition forming sections 12—12' thereof are sandwiched between the outer center partition sections 7—7' to provide a four-ply handle part. The outer center partition sections 7—7' and the inner center partition sections 12—12' are each provided with a hand hole opening 8 therein which fall into aligned registry when the carrier is assembled. The hand hole openings 8 in the outer center partition sections 7—7' may each be provided with a handle edging flap 9 to insure a comfortable hand grip.

The paired center partition sections 12—12' of the skeleton panels 11—11' extend from the upper horizontal edge of the handle part downwardly into the carrier and between the outer center partition sections 7—7'. A series of cross partition straps 13—13' are integrally hinged at the upper ends thereof by vertically extending scores 42 to tab portions extending downwardly from the lower end of the inner center partition sections 12—12'. The lower ends of the series of cross partition straps 13—13' are integrally hinged along vertically extending scores 44—44' to tab portions projecting upwardly from a longitudinally extending connecting band or strip 14—14'. The connecting bands 14—14' are designed to be adhesively secured to the inside face of the adjacent side panels 2—2' when the carriers are assembled. A sufficient number of cross partition straps 13—13' are provided to form the desired number of article-receiving cells for the twin compartments of the carrier.

In the blank forms shown in Figs. 1, 10 and 12, the series of inclined cross partition straps 13—13' are partially separated from the lower portions of the center partition sections 12—12' by inclined cuts 43—43', and are partially separated from the upper portion of the adjacent connecting bands 14—14' by inclined cuts 45—45'. As thus formed, the first pair of cross partition straps 13a—13a' are integrally hinged at the upper ends thereof by the vertical scores 42—42' to the downwardly projecting tab portions 12a—12a' of the center partition sections 12—12'; the upper ends of the second pair of cross partition straps 13b—13b' are integrally hinged along the vertical scores 42—42' to the adjacent downwardly projecting tabs 12b—12b'; the third pair of cross partition straps 13c—13c' are integrally hinged at the upper ends thereof along the vertical scores 42—42' to the next adjacent downwardly extending tabs 12c—12c'; the fourth pair of cross partition straps 13d—13d' are integrally hinged at the upper ends thereof along the vertical scores 42—42' to the next adjacent downwardly extending tabs 12d—12d'; and the fifth pair of cross partition straps 13e—13e' are integrally hinged at the upper ends thereof along the vertical scores 42—42' to the next adjacent downwardly extending tabs 12e—12e'. This leaves a pair of outer end tabs 12f—12f' extending downwardly from the center partition sections 12—12' with which no cross partition straps are associated.

The first pair of cross partition straps 13a—13a' are integrally hinged at the lower ends thereof along the vertical scores 44—44' to the adjacent tabs 14b—14b' projecting upwardly from the side panel liner bands 14—14'; the second pair of cross partition straps 13b—13b' are integrally hinged at the lower ends thereof by a pair of vertical scores 44—44' to the next adjacent upwardly extending tabs 14c—14c'; the third pair of cross partition straps 13c—13c' are integrally hinged at the lower ends thereof by the vertical scores 44—44' to the next adjacent upwardly projecting tabs 14d—14d'; the fourth pair of cross partition straps 13d—13d' are integrally hinged at the lower ends thereof along vertical scores 44—44' to the next adjacent upwardly projecting tabs 14e—14e'; and the fifth pair of cross partition straps 13e—13e' are integrally hinged at the lower ends thereof by vertical scores 44—44' to the next adjacent upwardly projected tabs 14f—14f'. It will be noted by referring to Figs. 1, 10 and 12 that the tabs 14a—14a' at one end of the side wall liner bands 14—14' have no cross partition straps associated therewith, and that the tabs 14f—14f' at the other end of the bands 14—14' project somewhat beyond the adjacent end edge of the center partition sections 12—12'. As indicated in Figs. 1, 10 and 12, any desired number of cross partition straps may be provided by making the blank of suitable width.

Figure 2:
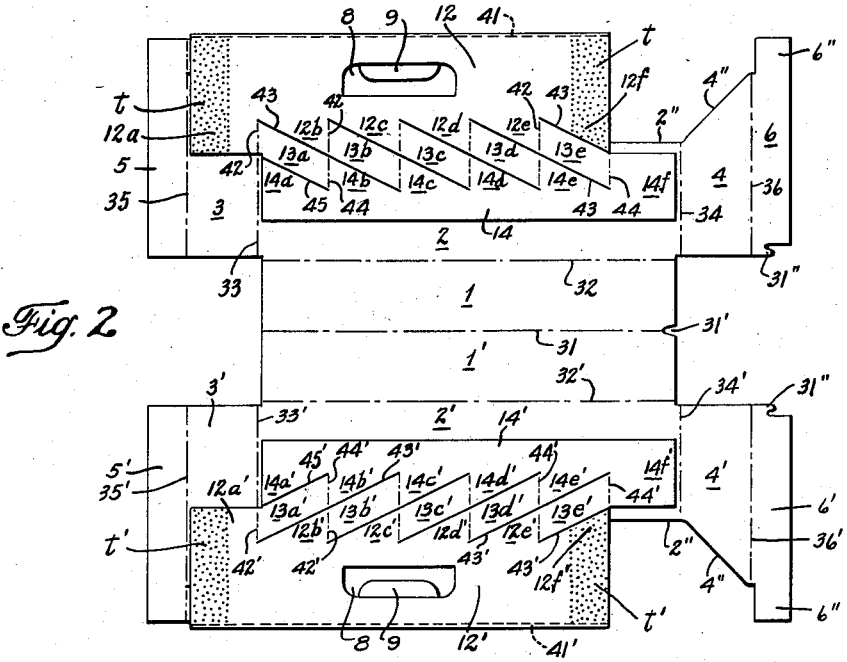
Fig. 2 is a plan view of the blank shown in Fig. 1 as it would appear after execution of the first folding operation, adhesive being shown applied to further areas of the blank preparatory to executing the second folding operation.

The blanks shown in Figs. 1, 10 and 12 may be assembled into completed carriers as shown in Figs. 9, 11 and 13 by applying adhesive patches r—r' to the entire inside faces of the outer center partition sections 7—7' and their associated triangular segments 10—10' as shown in Fig. 1. In substantially the same operation, adhesive patches s—s' are also applied to the entire inside faces of the side wall liner bands 14—14' and their associated upwardly projecting tabs. In the first folding operation, the skeleton panels 11—11' are folded inwardly along the longitudinal scores 41—41' as shown in Fig. 2 so that the side panel liner bands 14—14' become adhesively secured to the inside faces of the adjacent side panels 2—2' and the center partition sections 12—12' thereof become adhesively secured to the inside faces of the outer center partition sections 7—7'. In this folding operation, it will be noted that the triangular segments 10—10' become adhesively secured in aligned relation to the upper ends of the corresponding cross partition straps 13—13', and the tab portions projecting downwardly from the center partition sections 12—12' also become secured to the corresponding tab portions of the outer center partition sections 7—7'.

Figure 3:
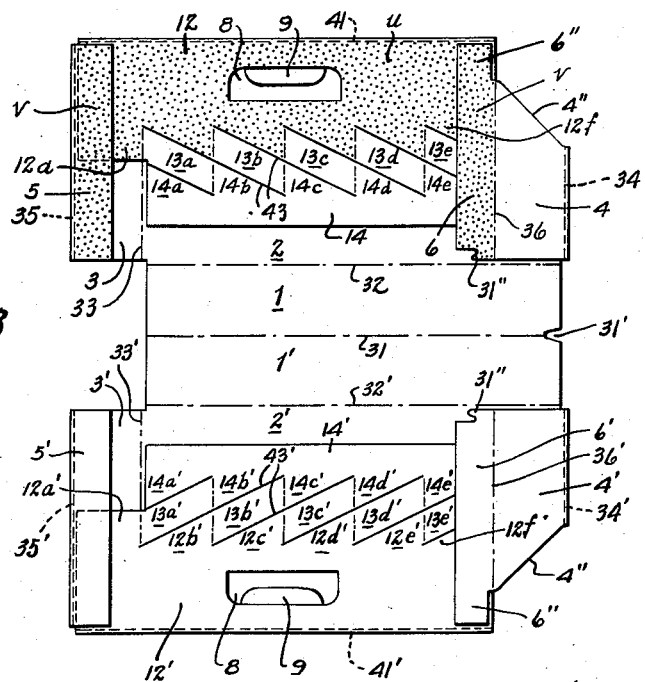
Fig. 3 is a plan view of the blank shown in Fig. 2 as it would appear after execution of the second folding operation thereon, additional areas of adhesive being shown applied thereto preparatory to executing the third folding operation.

In the second gluing operation, adhesive strips t—t' are applied to the outer end edges of the infolded center partition sections 12—12' of the skeleton panels as shown in Fig. 2. In the second folding operation, the end panel sections 4—4' are infolded along the aligned transverse scores 34—34' so that the center partition flaps 6—6' become adhesively secured by the glue strips t—t' on the adjacent outer ends of the center partition sections 12—12' as shown in Fig. 3. In substantially the same folding operation, the center partition flaps 5—5' are also infolded and secured to the adjacent outer ends of the center partition sections 12—12'.

In the third gluing operation, an adhesive patch u is applied to the entire exposed face of the center partition section 12 and adhesive strips v are applied to cover the entire length of the infolded center partition flaps 5 and 6 as shown in Fig. 3. In the third folding operation, the partially assembled blank shown in Fig. 3 is folded along the bottom collapsing score 31 so as to adhesively secure the center partition flaps 5' and 6' and the intervening center partition section 12' to the glued surfaces of the corresponding center partition flaps 5 and 6 and the intervening center partition section 12. This operation completes the assembly of the carrier in collapsed form as shown in Fig. 4.

Article carriers as above constructed may be shipped and stored in their collapsed form in limited space until they are to be filled with bottles or articles. The collapsed carrier may be readily expanded by exerting pressure on the ends of the collapsed carrier so as to cause expansion thereof as shown in Figs. 5 and 6. A pair of hook portions 31" formed at the lower ends of the center partition flaps 6—6' are designed to be hooked into a notch 31' formed in the adjacent end of the bottom panel to maintain the carrier in erected form.

The center partition structure for the carrier shown in

Fig. 21 is formed by a pair of skeleton panels 21—21' faced by the outer center partition sections 7—7' and having a center divider panel 26 sandwiched therebetween. The blank from which this carrier is formed is substantially rectangular in outline as shown in Fig. 14 and the paired skeleton panels 21—21' are integrally hinged at one end thereof to the adjacent end panel sections 3—3' along the transversely aligned folding scores 51—51', and are also integrally hinged to the adjacent ends of the outer center partition sections 7—7' along the score extensions 51'' which are substantially in alignment with the transverse scores 51—51'. The skeleton panels 21—21' have a length substantially equal to the length of the carrier, and each has a height substantially equal to the combined height of the adjacent side panel 2—2' and the handle facing flap 7—7' thereabove.

The skeleton panels 21—21' present a pair of center partition sections 22—22' at the upper ends thereof which are sandwiched between the outer center partition sections 7—7' to provide a four-ply handle part. The outer center partition sections 7—7' and the inner center partition sections 22—22' are each provided with a hand hole opening 8 therein which fall into aligned registry when the carrier is assembled. The center partition sections 22—22' extend from the upper horizontal edge of the handle part downwardly into the carrier. A series of cross-partition straps 23—23' are integrally hinged at the upper end thereof by spaced and vertically extending scores 52—52' to tab portions extending downwardly from the lower end of the center partition sections 22—22'. The opposite lower ends of the cross-partition straps 23—23' are integrally hinged along spaced and vertically extending scores 53—53' to tab portions projecting upwardly from a pair of longitudinally extending connecting bands 24—24'. The connecting bands 24—24' are designed to be adhesively secured to the inside face of the adjacent side panels 2—2' when the carrier is assembled. A sufficient number of paired cross-partition straps 23—23' are provided to form the desired number of article receiving cells in the twin compartments of the carrier.

In the blank form shown in Fig. 14, the series of inclined cross-partition straps 23—23' are partially separated from the lower portions of the center partition sections 22—22' by inclined cuts 54—54' and are partially separated from the upper portions of the adjacent connecting bands 24—24' by inclined cuts 55—55'. As thus formed, the first pair of cross-partition straps 23a—23a' are integrally hinged along the vertical scores 52—52' to the downwardly projecting tab portions 22a—22a' of the center partition sections 22—22'. The second pair of cross-partition straps 23b—23b' are integrally hinged along the next pair of vertical scores 52—52' to the adjacent downwardly projecting tabs 22b—22b'; the third pair of cross-partition straps 23c—23c' are integrally hinged along the vertical scores 52—52' to the next adjacent downwardly extending tabs 22c—22c'; the fourth pair of cross-partition straps 23d—23d' are integrally hinged along the vertical scores 52—52' to the next adjacent downwardly extending tabs 22d—22d'; and the fifth pair of cross-partition straps 23e—23e' are integrally hinged along the vertically extending scores 52—52' to the next adjacent downwardly extending tabs 22e—22e'. It will be noted by referring to Fig. 14 that the first pair of tabs 22a—22a' each presents a triangular end extension whose lower edge is approximately in alignment with the adjacent longitudinally extending side panel defining score 32—32'.

The first pair of cross-partition straps 23a—23a' are integrally hinged at the lower ends thereof by the vertical scores 53—53' to the adjacent tab portions 24a—24a' projecting upwardly from the side panel reinforcing bands 24—24'. The second pair of cross-partition straps 23b—23b' are integrally hinged at the lower end thereof by the vertical scores 53—53' to the next adjacent upwardly extending tabs 24b—24b'; the third pair of cross-partition straps 23c—23c' are integrally hinged at the lower ends thereof by the vertical scores 53—53' to the next adjacent upwardly projecting tabs 24c—24c'; the fourth pair of cross-partition straps 23d—23d' are integrally hinged at the lower ends thereof by the vertical scores 53—53' to the next adjacent upwardly extending tabs 24d—24d'; and the fifth pair of cross-partition straps 23e—23e' are integrally hinged at the lower ends thereof by the vertical scores 53—53' to the next adjacent upwardly projecting tabs 24e—24e'. It will be noted by referring to Fig. 14 that the last pair of upwardly projecting tabs 24e—24e' of the side wall liner bands 24—24' project laterally slightly beyond the adjacent vertical end edges of the center partition sections 22—22'. The other end of the side wall liner bands 24—24' are defined by the first pair of inclined cuts 55—55' which separate the band ends from the adjacent triangular extensions of the tab portions 22a—22a' which project downwardly from the center partition section 22—22'.

The blank shown in Fig. 14 incorporates a center divider panel 26 which is captured from the material between the laterally extending skeleton panels 21—21'. The ends of the center divider panel 26 are substantially in alignment with the ends of the center partition sections 22—22' of the skeleton panels 21—21'. The center divider panel 26 is integrally hinged by a longitudinal score 56 to the lower end of the triangular shaped extension of the downwardly projecting tab portion 22a, but is otherwise separated by an aligned cut 56' from the lower free edge of the adjacent side wall liner band 24. The center divider panel 26 is also separated by a longitudinally extending line cut 57 from the lower end of the triangular extension of the downwardly projecting tab portion 22a' of the center-partition section 22', and also from the lower edge of the side wall liner band 24', except for narrow uncut necks 57' which facilitate initial folding assembly of the carrier blank. During the later stage of assembly, the connecting necks 57' are broken as will subsequently appear.

To provide a finished top edge for the center partition structure of this carrier, an edging flap 28 may be hinged to the upper edge of the handle facing flap 7 along a longitudinally extending score 58 as shown in Fig. 14. The edging flap 28 preferably extends the full length of the outer center partition section 7 and may be relatively narrow in width. The use of an edging flap 28 is entirely optional.

The blank shown in Fig. 14 is assembled into the completed carrier as shown in Fig. 21 by applying adhesive patches r—r' to the inside faces of the center partition sections 22—22' and to the downwardly extending tab portions 22b—22b', 22c—22c', 22d—22d', and 22e—22e' thereof as shown in Fig. 14. The adhesive patches r—r' also cover the upper portions of the cross partition straps 23—23' which are to be secured to the corresponding reinforcing segments 10—10' connected with the outer center partition sections 7—7'. Care must be exercised to apply no adhesive to the remaining portions of the cross partition straps 23—23' which are not to be covered by the reinforcing segments 10—10', and no adhesive is to be applied to those portions of the downwardly projecting tabs 22a—22a' which are initially folded to overlie the adjacent end panel sections 3—3'. In substantially the same operation, adhesive patches s—s' are applied to the entire inside faces of the side wall liner bands 24—24' and their associated upwardly projecting tab portions 24a—24a'; 24b—24b'; 24c—24c'; 24d—24d'; and 24e—24e' as shown in Fig. 14.

In the first folding operation, the skeleton panels 21—21' are folded along the aligned transverse scores 51—51' and 51'' as shown in Fig. 15 so that the side panel liner bands 24—24' become adhesively secured to the inside faces of the side panels 2—2'. As thus folded, the center partition sections 22—22' become adhesively secured to the inside faces of the outer center partition sections 7—7' and the upper glued portions of the inclined cross partition straps 23—23' become adhesively secured to the corresponding triangular segments 10—10' associated with the lower edges of the outer center partition sections 7—7' to thereby reinforce the same. In this folding operation, the unglued center divider panel 26 is also positioned to overlie the bottom panel sections 1—1' as shown in Fig. 3.

In the second gluing operation, adhesive strips w—w' are applied to the free vertical end edge of the infolded center partition sections 22—22' as shown in Fig. 15, care being taken to apply no adhesive to the adjacent cross-partition straps 23e—23e'. In the second folding operation, the end panel sections 4—4' are folded along the aligned transverse scores 34—34' so as to adhesively secure their associated center partition securing flaps 6—6' to the glued vertical edge of the center partition sections 22—22' as shown in Fig. 16.

In the third gluing operation, an adhesive patch x is applied to that area of the infolded skeleton panel 21 which is to be covered by the center divider panel 26 which is next upfolded. The adhesive patch x substantially covers the downwardly projecting tab portions 22a, 22b, 22c, 22d, 22e, and 22f of the center partition section 22 and also covers that portion of the inturned center partition securing flap 6 which is to be covered by adjacent end edge of the center divider panel 26. In the third folding operation, the connecting necks 57' are broken and the center divider panel 26 is upfolded into adhesively secured relation to the downwardly projecting tabs 22a, 22b, 22c, 22d, 22e and 22f and to the glued surface of the inturned center partition securing flap 6 as shown in Fig. 17.

In the fourth gluing operation, a patch y of adhesive is applied to the entire surface of the center partition section 22' of the skeleton panel 21', and particularly to the downwardly projecting tab portions 22a', 22b', 22c', 22d', 22e' and 22f' thereof as shown in Fig. 17. The adhesive patch y also covers the inturned center partition flap 6' as shown in Fig. 17. In the fourth folding operation, the partially assembled carrier blank as shown in Fig. 17 is folded along the bottom panel collapsing score 31 so as to place the glued surface of the center partition section 22' and the center partition securing flap 6' in adhesively secured relation to the previously upfolded center divider panel 26, and to the exposed area of the center partition section 22 and securing flap 6 as shown in Fig. 18. Where an edging flap 28 is provided for the center partition structure, a longitudinal adhesive strip z is applied to the adjacent longitudinal edge of the outer center partition section 7' as shown in Fig. 18, and the edging flap 28 is then downfolded into secured relation thereto, thereby completing the assembly of the carrier in collapsed form.

It will be appreciated that by a proper selection of the number of paired cross-partition straps 23—23' and a proper proportioning of the blank parts, that carriers having any desired number of cells may be assembled from blanks which are generally formed as illustrated in Fig. 14. For example, where a six-cell carrier is to be formed, only two pairs of cross-partition straps 23a—23a' and 23e—23e' would be provided and the blank parts would be correspondingly reduced in size. Similarly, to make an eight-cell carrier, only three pairs of cross-partition straps 23a—23a' and 23b—23b' and 23e—23e' would be provided, and the blank would be correspondingly contracted in longitudinal length.

Collapsed carriers constructed from blanks formed as generally illustrated in Fig. 14, and provided with any desired number of paired article receiving cells, may be readily erected by exerting pressure on the ends of the collapsed carrier to effect expansion thereof. The expanded carrier can be retained in expanded position by connecting the paired hook portions 31" associated with the lower ends of the paired center partition securing flaps 6—6' to the end notch 31' forming the adjacent end of the bottom panel.

Strap partitioned carriers made in accordance with this invention are substantially superior to the prior art strap partitioned carriers as heretofore made in strength, durability and appearance. The prior art strap partitioned carriers present cross-partition straps of single-ply thickness only, with the result that the partitioning straps are often broken in use at their juncture with the handle structure where the greatest stress is imposed when the cells of the carrier are filled with bottles or other articles. In carriers made in accordance with this invention, the upper ends of the cross-partition straps are of double-ply thickness and are sturdily reinforced by the triangular reinforcing segments 10—10' at their hinging juncture with the center partition structure.

Additionally, these improved carriers present handle parts which are of four-ply thickness throughout, and the paired center partition sections of the skeleton panels extend some distance below the upper edges of the side panels to thereby provide cushioning protection for adjacent articles contained within the twin compartments of the carrier. These improved carriers may also be provided with a center divider panel 26 which extends substantially down to the erected bottom panel to provide complete cushioning separation and protection for adjacent articles in the twin compartments.

Carriers constructed in accordance with this invention present side panels 2—2' of uniform height, with smooth top edges, which enhances the appearance of the carrier and provides additional protection for the articles contained in the cells thereof. The side panels are further stiffened and reinforced by the side wall liner bands forming a part of the skeleton panels and the lower ends of the cross-partition straps are located below the top edges of the side panels so that the inclined cross partitions are positioned to provide maximum cushioning and separating protection for adjacent articles in adjacent cells.

These improved article carriers are made from one-piece blanks which can be cut and scored with very little waste of stock sheet material. The blanks may be assembled into collapsed carrier form economically and at high speed with a limited number of gluing operations and folding operations, which can be performed on a standard right-angle gluing and folding machine. Blanks may be so sized and cut as to form any desired number of spaced cross-partition straps to provide any desired number of article cells in the carriers assembled therefrom.

While certain novel features of this invention have been disclosed herein and are pointed out in the claims, it will be understood that various omissions, substitutions and changes may be made by those skilled in the art without departing from the spirit of this invention.

What is claimed is:

1. A multi-cell twin compartment article carrier formed from a single blank of sheet material including, a bottom panel, a pair of side panels foldably connected to the opposite side edges of the bottom panel, a pair of end panel sections at each end of the carrier foldably connected to adjacent end edges of the side panels, a pair of inner center partition sections foldably connected to both pairs of end panel sections and extending along the longitudinal mid-section of the carrier and projecting above the side panels, a pair of outer center partition sections secured to the outside faces of said inner center partition sections and forming therewith a four-ply handle part for the carrier, a series of inclined cross partition straps arranged in spaced cell-forming relation and integrally hinged along vertical scores to the lower portion of each of said inner center partition sections, a connecting band secured to the inside face of each side panel and having the lower ends of the adjacent cross partition straps integrally hinged thereto by vertical extending scores, each of said outer center partition sections presenting reinforcing segments integrally hinged thereto along vertical extending scores and respectively secured to the adjacent series of cross partition straps, one of said inner partition sections having a leg portion extending downwardly from one end thereof and below the adjacent cross partition straps, and a center divider panel integrally hinged to the lower end of said leg portion and extending upwardly between said inner center partition sections.

2. A multi-cell twin compartmented article carrier forming blank having a bottom panel, a pair of side panels foldably connected to the opposite side edges of said bottom panel, an end panel section foldably connected to each end edge of both side panels, a center partition portion foldably connected to each of said end panel sections and having an end extension projecting beyond the top edge of the adjacent end panel section, a pair of outer center partition sections each having a finger insertion opening therein and each substantially separated from the top edge of the adjacent side panel and end panel section but integrally hinged at one end thereof to the adjacent end extension of one of said center partition portions, a pair of inner center partition sections each having a finger insertion opening therein and being foldably connected to the adjacent outer center partition section, a series of inclined cross partition straps integrally hinged at one end thereof by transverse scores to each of said inner center partition sections, and a series of spaced reinforcing segments integrally hinged along vertically extending scores to each of said outer center partition sections and designed to be secured to the corresponding series of cross partition straps when the blank is assembled into carrier form.

3. A multi-cell twin compartmented article carrier forming blank having a bottom panel, a pair of side panels foldably connected to the opposite side edges of said bottom panel, an end panel section foldably connected to each end edge of both side panels, a center partition portion foldably connected to each of said end panel sections and having an end extension projecting beyond the top edge of the adjacent end panel section, a pair of outer center partition sections each substantially separated from the top edge of the adjacent side panel and end panel section and integrally hinged at one end thereof to the adjacent end extension of one of said center partition portions, one pair of said center partition portions each including an inner center partition section foldably connected to the adjacent outer center partition section, a leg portion integral with and projecting from each of said inner center partition sections, a longitudinally extending band separated from said leg portion and shiftable laterally with respect to said inner center partition section and associated leg portion, a series of inclined cross partition straps each integrally hinged at one end thereof by transverse scores to each of said inner center partition sections and integrally hinged at the other end thereof by transverse scores to the adjacent longitudinal band, and a series of spaced reinforcing segments integrally hinged along vertically extending scores to each of said outer center partition sections and designed to be secured to the corresponding series of cross partition straps when the blank is assembled into carrier form.

4. A multi-cell twin compartmented article carrier forming blank having a bottom panel, a pair of side panels foldably connected to the opposite side edges of said bottom panel, an end panel section foldably connected to each end edge of both side panels, a center partition portion foldably connected to each of said end panel sections and having an end extension projecting beyond the top edge of the adjacent end panel section, a pair of outer center partition sections each substantially separated from the top edge of the adjacent side panel and end panel section and foldably connected at one end thereof to the adjacent end extension of one of said center partition portions, a pair of skeleton panels each including an inner center partition section foldably connected to the top of the edge of the adjacent outer center partition section, a series of inclined cross partition straps hinged by transverse scores to each inner center partition section, and a longitudinally extending band designed to be secured to the inside face of the adjacent side panel when the carrier is assembled, each series of cross partition straps being integrally hinged at the other ends thereof to the adjacent longitudinal band, and a series of spaced reinforcing segments integrally hinged along vertically extending scores to each of said outer center partition sections and designed to be secured to the corresponding series of cross partition straps when the blank is assembled into carrier form.

5. A multi-cell twin compartmented article carrier forming blank having a bottom panel presenting foldably connected bottom sections, a pair of side panels foldably connected to the opposite side edges of said bottom panel, an end panel section foldably connected to each end edge of both side panels, one pair of end panel sections at one end of the blank each having a center partition securing flap integrally hinged thereto and the other pair of end panel sections at the other end of the blank each having a skeleton panel integrally hinged thereto, a pair of outer center partition sections each substantially separated from the top edge of the adjacent side panel and end panel section and integrally hinged at one end thereof to the adjacent upper end edge of the adjacent skeleton panel, each of said skeleton panels presenting an inner center partition section, a longitudinally extending band designed to be secured to the inside face of the adjacent side panel when the carrier is substantially assembled, and a series of inclined cross partition straps integrally hinged at one end thereof by transverse scores to the inner center partition section and integrally hinged at the other end thereof by transverse scores to said longitudinal band, and a series of spaced reinforcing segments integrally hinged along vertically extending scores to each of said outer center partition sections and designed to be secured to the corresponding series of cross partition straps when the blank is assembled into carrier form.

References Cited in the file of this patent

UNITED STATES PATENTS

| | | |
|---|---|---|
| 2,322,396 | Slevin | June 22, 1943 |
| 2,458,281 | Lupton | Jan. 4, 1949 |
| 2,615,612 | Vines | Oct. 28, 1952 |
| 2,634,043 | Arneson | Apr. 7, 1953 |
| 2,660,361 | Tyrseck | Nov. 23, 1953 |
| 2,687,232 | Arneson | Aug. 24, 1954 |